United States Patent
Wojciechowski (10) Patent No.: US 11,887,407 B2
(45) Date of Patent: Jan. 30, 2024

(54) EQUIPMENT REPAIR CONTROL SYSTEM (71) Applicant: General Electric Company, Schenectady, NY (US)

(72) Inventor: Robert Stanley Wojciechowski, Atlanta, GA (US)

(73) Assignee: General Electric Company, Schenectady, NY (US)

(*) Notice: Subject to any disclaimer, the term of this patent is extended or adjusted under 35 U.S.C. 154(b) by 228 days.

(21) Appl. No.: 15/486,963

(22) Filed: Apr. 13, 2017

(65) Prior Publication Data
US 2017/0301150 A1  Oct. 19, 2017

Related U.S. Application Data (63) Continuation-in-part of application No. 14/031,219, filed on Sep. 19, 2013, now abandoned.

(60) Provisional application No. 61/704,691, filed on Sep. 24, 2012.

(51) Int. Cl.
| | | |
|---|---|---|
| *G07C 5/00* | (2006.01) | |
| *G05D 1/00* | (2006.01) | |
| *G06Q 10/20* | (2023.01) | |
| *G06Q 10/0631* | (2023.01) | |

(Continued)

(52) U.S. Cl.
CPC ........... *G07C 5/006* (2013.01); *G05D 1/0088* (2013.01); *G06Q 10/06* (2013.01); *G06Q 10/063118* (2013.01); *G06Q 10/0875* (2013.01); *G06Q 10/20* (2013.01); *G07C 5/008* (2013.01)

(58) Field of Classification Search
CPC ...... G07C 5/006; G07C 5/008; G05D 1/0088; G06Q 10/06; G06Q 10/063118; G06Q 10/0875; G06Q 10/20
See application file for complete search history.

(56) References Cited

U.S. PATENT DOCUMENTS

| | | | | |
|---|---|---|---|---|
| 4,383,298 A | * | 5/1983 | Huff ....................... | G06Q 10/06 |
| | | | | 705/28 |
| 4,404,639 A | * | 9/1983 | McGuire .............. | G01R 31/007 |
| | | | | 701/32.7 |

(Continued)

FOREIGN PATENT DOCUMENTS

WO  WO-2011031008 A2 * 3/2011  ............. G06Q 30/00

*Primary Examiner* — Daniel L Greene
(74) *Attorney, Agent, or Firm* — Buckley, Maschoff & Talwalkar LLC (57) ABSTRACT

A vehicle repair control system includes a sensor generating data signals relating to a vehicle, a communication system, and one or more processors that determine a repair to be performed on the vehicle based on the sensor data signals received over the communication system. The processors examine historic repair data indicative of outlays for previous repairs of other vehicles, and examine the historic repair data to determine fluctuations in the outlays for the previous repairs to determine a projected outlay for the repair to be performed on the vehicle based on the fluctuations. The processors determine a quantity-based reduction in the projected outlay based on a number of repairs performed at a repair facility and communicate a control signal to the repair facility to autonomously direct the repair to be performed on the vehicle responsive to determining the quantity-based reduction to change a state of the vehicle.

20 Claims, 3 Drawing Sheets

(51) Int. Cl.
    *G06Q 10/0875* (2023.01)
    *G06Q 10/06* (2023.01)

(56) References Cited

U.S. PATENT DOCUMENTS

| | | | | |
|---|---|---|---|---|
| 5,445,347 A * | 8/1995 | Ng | ............................ | G08G 9/00 |
| | | | | 246/169 R |
| 6,216,108 B1 * | 4/2001 | LeVander | .......... | G06Q 30/0203 |
| | | | | 705/400 |
| 6,216,109 B1 * | 4/2001 | Zweben | ................ | G06Q 10/04 |
| | | | | 705/7.12 |
| 6,799,154 B1 * | 9/2004 | Aragones | ............... | G06Q 10/06 |
| | | | | 703/22 |
| 2002/0007237 A1 * | 1/2002 | Phung | ................ | G05B 23/0216 |
| | | | | 701/31.4 |
| 2003/0055666 A1 * | 3/2003 | Roddy | ............. | G06Q 10/06395 |
| | | | | 705/305 |
| 2003/0233278 A1 * | 12/2003 | Marshall | ................ | G06Q 30/00 |
| | | | | 705/14.35 |
| 2004/0064225 A1 * | 4/2004 | Jammu | ................ | G06Q 10/06 |
| | | | | 701/29.4 |
| 2004/0073434 A1 * | 4/2004 | Volquardsen | .......... | G06Q 10/06 |
| | | | | 705/305 |
| 2004/0254764 A1 * | 12/2004 | Wetzer | ............... | G06Q 10/0635 |
| | | | | 702/184 |
| 2005/0004821 A1 * | 1/2005 | Garrow | ................ | G06Q 10/087 |
| | | | | 705/7.11 |
| 2007/0078791 A1 * | 4/2007 | Vyas | ................... | G06Q 30/0283 |
| | | | | 705/400 |
| 2009/0254240 A1 * | 10/2009 | Olsen, III | .............. | G07C 5/008 |
| | | | | 701/29.5 |
| 2011/0145030 A1 * | 6/2011 | Allen | ..................... | G06Q 30/02 |
| | | | | 705/28 |
| 2011/0153459 A1 * | 6/2011 | Kirian | .................... | G06Q 10/06 |
| | | | | 705/305 |
| 2011/0251929 A1 * | 10/2011 | Pfeffer | ............... | G06Q 10/0837 |
| | | | | 705/28 |
| 2012/0089474 A1 * | 4/2012 | Xiao | ................. | G06Q 10/06311 |
| | | | | 705/26.4 |
| 2012/0116828 A1 * | 5/2012 | Shannon | ................ | G06Q 30/02 |
| | | | | 705/14.35 |
| 2013/0325541 A1 * | 12/2013 | Capriotti | ............... | G06Q 10/20 |
| | | | | 705/7.21 |
| 2014/0052499 A1 * | 2/2014 | Wagner | .................. | G06Q 10/06 |
| | | | | 705/7.36 |
| 2014/0089054 A1 * | 3/2014 | Knapp | ................... | G08B 21/18 |
| | | | | 705/7.35 |

* cited by examiner

EQUIPMENT REPAIR CONTROL SYSTEM

CROSS-REFERENCE TO RELATED APPLICATIONS

The present application is a non-provisional continuation-in-part of and claims priority to U.S. application Ser. No. 14/031,219, which was filed on Sep. 19, 2013, now abandoned, and which claims priority to U.S. provisional application Ser. No. 61/704,691 the entire content of each of which are incorporated by reference herein in their entirety.

BACKGROUND

Technical Field

Embodiments of the subject matter disclosed herein relate to systems that perform repairs on equipment.

Discussion of Art

Maintenance performed on equipment such as vehicles can prolong the service life (also referred to as useful life) of the equipment and reduce downtime of the equipment (relative to not performing maintenance). Although repairs (including preventative maintenance) can extend service lives of equipment, each repair includes an outlay based on labor and/or part(s) to complete such repair. Repairs are often handled on an as-needed basis, which can strain management of labor, parts, and the like, due to the unpredictability of such procedures.

BRIEF DESCRIPTION

In one embodiment, a vehicle repair control system includes at least one sensor configured to generate data signals relating to a first vehicle, a communication system operatively coupled to the at least one sensor, and one or more processors configured to determine a repair to be performed on the first vehicle based at least in part on the data signals received by the one or more processors from the at least one sensor over the communication system. The one or more processors also are configured to examine historic repair data indicative of outlays for previous repairs of other vehicles, and are configured to examine the historic repair data to determine fluctuations in the outlays for the previous repairs of the other vehicles and to determine a projected outlay for the repair to be performed on the first vehicle based on the fluctuations in the outlays. The one or more processors are configured to determine a quantity-based reduction in the projected outlay based on a number of repairs performed at a repair facility and to communicate a control signal to the repair facility to autonomously direct the repair to be performed on the first vehicle responsive to determining the quantity-based reduction to change a state of the first vehicle from a faulty state to a repaired state.

In one embodiment, a system includes at least one sensor configured to generate data signals relating to a first vehicle, a communication system operatively coupled to the at least one sensor, and one or more processors configured to determine a repair to be performed on the first vehicle based at least in part on the data signals received from the at least one sensor via the communication system. The one or more processors also are configured to examine historic repair data indicative of outlays for previous repairs of other vehicles, and to examine the historic repair data to determine fluctuations in the outlays for the previous repairs of the other vehicles. The one or more processors are configured to determine a projected outlay for the repair to be performed on the first vehicle based on the fluctuations in the outlays, and to perform the repair on the first vehicle based on the projected outlay by communicating a control signal to a repair facility where the repair is performed on the first vehicle to change a state of the first vehicle from a faulty state to a repaired state.

In one embodiment, a system includes at least one sensor configured to generate data signals relating to a first equipment, a communication system operatively coupled to the at least one sensor, and one or more processors configured to determine a repair to be performed on the first equipment based at least in part on the data signals received from the at least one sensor via the communication system. The one or more processors also are configured to examine historic repair data indicative of outlays for previous repairs of other equipment, and to determine a projected outlay for the repair to be performed on the first equipment based on the historic repair data. The one or more processors also are configured to perform the repair on the first equipment based on the projected outlay by communicating a control signal to a repair facility where the repair is performed on the first equipment to change a state of the first equipment from a faulty state to a repaired state.

BRIEF DESCRIPTION OF THE DRAWINGS

With reference to the drawings, like reference numerals designate identical or corresponding parts throughout the several views. However, the inclusion of like elements in different views does not mean a given embodiment necessarily includes such elements or that all embodiments of the inventive subject matter include such elements.

Reference is made to the accompanying drawings in which particular embodiments of the inventive subject matter are illustrated as described in more detail in the description below, in which.

DETAILED DESCRIPTION

Embodiments of the inventive subject matter described herein relate to equipment repair systems that determine a projected outlay for at least one repair associated with one or more items of equipment. Based on evaluation of a portion of historic repair data for the equipment, a forecast component can create a projected outlay to perform a repair. An outlay component can aggregate or receive a portion of historic data related to repair outlays previously performed. The outlay component can further ascertain a repair outlay per duration of time for equipment. Based on at least one of the portion of historic data or the repair outlay per duration of time, the forecast component can indicate a projected outlay for at least one repair for one or more items of equipment.

A component includes hardware circuitry that includes and/or is connected with one or more processors (e.g., one or more microprocessors, field programmable gate arrays, and/or integrated circuits) configured for the carrying out of one or more functions and/or methods (e.g., operations described herein), through execution of associated software (stored in a non-transitory electronic-readable medium), through the arrangement of the circuits/circuitry, and/or otherwise. Software includes instructions that are readable and/or executable by hardware, and may be stored in non-transitory electronic-readable media, which cause the hardware to perform designated functions, designated actions, and/or behave in a desired manner. Non-transitory electronic-readable media include, but are not limited to, non-volatile random access memory (RAM), read only memory (ROM), programmable ROM (PROM), an optical disc, a removable flash memory card, a hard disk drive, a magnetic tape, a floppy disk, and/or combinations thereof.

Equipment can include one or more fixed and/or mobile systems owned and/or operated by a client entity such as, for example, a railroad, a power generation company, a shipping company (e.g., land, sea, air, and/or a combination thereof), a mining equipment company, an airline, or another equipment-owning and/or equipment-operating entity. A vehicle includes mobile equipment or moveable transportation equipment that transports at least one of a person, people, or a cargo. For instance, a vehicle can be, but is not limited to being, a rail car, an intermodal container, a locomotive, a marine vessel, mining equipment, a stationary power generation equipment, industrial equipment, construction equipment, an automobile, a truck, a trailer, or the like.

A repair facility includes a location that evaluates and/or performs a repair on equipment, such as vehicles. A Car Repair Billing (CRB) system is a system that facilitates reporting and/or invoicing railroads, car owners, equipment owners, vehicle owners, lessee, lessor, among others. CRB includes Association of American Railroads (AAR) administered as well as contract billing, and another suitable billing for railroads.

A Maintenance Management System (MMS) is a system that analyzes repairs for equipment (e.g., vehicles) and/or auditing repairs for vehicles to railroads, car owners, client equipment owners, vehicle owners, lessee, lessor, among others. The MMS can receive repair information from a repair facility. The vehicle owner can use MMS to input repair data received from repair facility and then determine views, audits, pays, etc. based on the data that is received.

A part includes a device that is a portion of client equipment and/or a portion of a vehicle involved in a repair for the equipment or vehicle. Repair of equipment includes a service performed on equipment (e.g., a vehicle), where the service can fix a part, replace a part, maintain a part, repair of a portion of equipment using one or more parts, a replacement of a portion of the vehicle, a maintenance of a portion of the vehicle, and the like. Events occurring in real-time are those events occurring upon receipt of data or a point later in time based on or responsive to receipt of data.

Outlays include labor expended, parts consumed, and/or prices paid (or expected to be paid) in exchange for and/or during performance of a repair. Outlays can include all or a part of a repair, and can be segmented using modifiers such as labor outlay, parts outlay, rental outlay, lost opportunity outlay, and the like. The outlay can be owed and payable immediately, or can be accrued for later payment. Further, outlays may be offset against, for example, credits and may not refer directly to an amount for a single transaction. Even further, discounts for volume, for loyalty programs, and for other aspects may affect a determined outlay. Thus, outlay should be considered in its broadest reasonable sense as modified by context.

Figure 1:
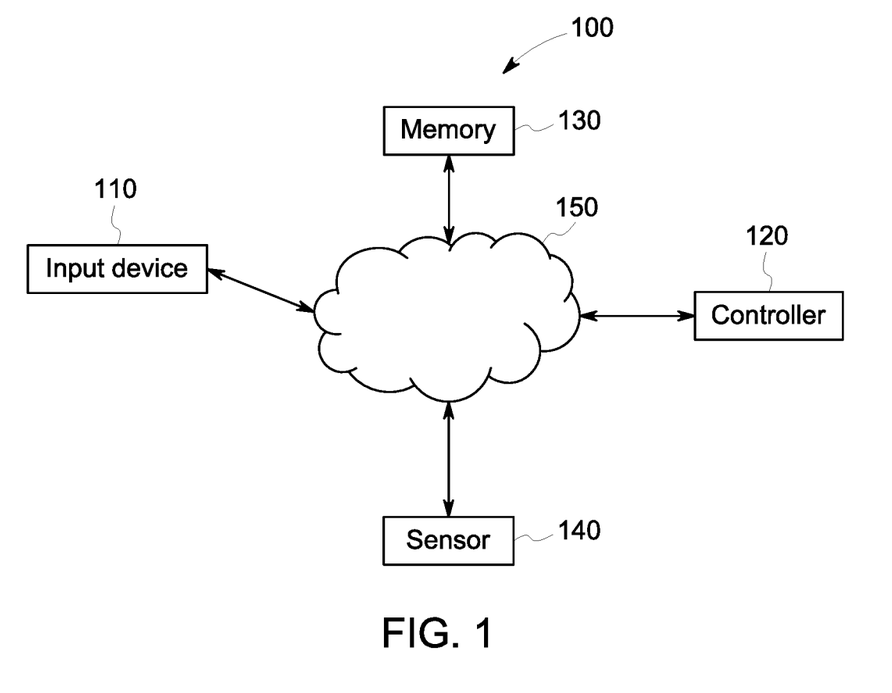
FIG. 1 illustrates an embodiment of an equipment repair system for indicating a projected outlay for a repair to be performed on one or more items of equipment.

FIG. 1 illustrates an equipment repair system 100 for indicating a projected outlay for a repair to be performed on equipment. The equipment repair system optionally may be referred to as a vehicle repair system. The equipment repair system includes one or more input devices 110 that receive or aggregate repair information related to equipment. The input device 110 can include one or more keyboards, touchscreens, microphones, transceiving or receiving circuitry (e.g., one or more antennas, modems, etc.), or the like, that can receive information from one or more sources. In one embodiment, the system 100 includes one or more sensors 140 that detect, measure, or otherwise sense information about equipment, such as temperatures, images, emitted radiation, distances, etc. The sensors 140 generate and communicate data signals representative of this information to the controller 120 via a communication system 150 (described below). This information can be repair information useful for determining whether to repair the equipment and/or which repair to perform. For example, elevated temperatures measured by a sensor can indicate a need to fix or repair a cooling system. As another example, smaller radii, circumferences, or diameters of a wheel as measured by a sensor can indicate a need to repair (e.g., trim) or replace the wheel. The repair information (e.g., also referred to as a portion of historic data related to an outlay of a repair for equipment) can relate to or represent previously performed repairs on the same or other equipment. The equipment repair system includes a controller 120 that represents hardware circuitry including and/or connected with one or more processors (e.g., one or more microprocessors, field programmable gate arrays, and/or integrated circuits). The controller receives the repair information obtained by the input device and generates a projected outlay for a repair to be performed on equipment based upon the evaluation of the repair information. The cost component can be a stand-alone component (as depicted), incorporated into the forecast component, or a combination thereof. The forecast component can be a stand-alone component (as depicted), incorporated into the cost component, or a combination thereof.

The input device can receive or collect real-time data associated with a quote or estimate for an outlay for the repair to be performed. This quote or estimate can be provided from a source, such as the seller of the equipment or part(s) to be used in the repair. For instance, the quote or estimate of the outlay can include an outlay for one or more part(s) used to perform the repair and/or a labor fee related to perform the repair.

The controller can evaluate a portion of historic data related to the outlay of the repair to ascertain an outlay fluctuation over a time period. In an embodiment, the controller can utilize the ascertained outlay fluctuation over the time period to create a projected outlay. In another example, a season or timing of an acquisition of the part(s) to be used in the repair can be utilized to identify patterns in outlay fluctuations for a repair or a part used with a repair. The controller can use an identified pattern to forecast a projected outlay for a repair to be performed on equipment.

For instance, the input device can receive a query (e.g., a request) related to equipment. This query may request a projected outlay for performing maintenance or repairs on equipment for a duration of time or a point of time in the future. For example, an operator of the equipment repair system can input a request for the total outlay projected for maintaining and repairing a piece of equipment for the next six months. The equipment repair system can examine the repair information in order to generate a projected outlay for the query for the point of time or the duration of time. In an embodiment, the projected outlay can be identified for a number of repairs that are to be performed (e.g., identification of incoming repairs that are to be performed on one or more items of equipment, among others). In an embodiment, the projected outlay can be identified for a number of repairs that may be performed (e.g., based on forecasting, projecting, hypothetical situations, among others). For example, the controller may access a memory 130 that stores the number of repairs performed on the same or similar equipment (e.g., where similar equipment may be equipment of the same make and model, but different serial or other unique identifying numbers), the outlays expended for these previous repairs, the frequency at which the repairs are performed, the times at which the repairs are performed during the service life of the equipment, etc. This historical repair information may be obtained via the input device, as described above.

The controller can generate a projected outlay for equipment based on the repair information. In an embodiment, the controller can evaluate the repair information to identify an outlay per a duration of time for each repair previously performed, where the controller examines utilizes the outlay per the duration of time to generate a projected outlay for a query or a repair to perform. For instance, for a first piece of equipment (e.g., a first vehicle), the controller may examine the historical repair information of the first vehicle to determine that a repair is scheduled to be performed or was performed on the same or similar equipment at a frequency of once every two weeks, with a designated outlay for each performance of the repair. Based on this example, the controller can determine an outlay per a duration of time for the same repair on the same first vehicle or a different, second vehicle (e.g., a similar vehicle) to be the designated outlay every two weeks. This information can be used by the controller to generate a projected outlay for the repair for a different duration of time and/or a varying number of items of equipment.

In another embodiment, the controller can calculate an average outlay for performance of a repair based on an evaluation of historic data related to the repair. The controller can use the average outlay for each repair to generate a projected outlay for a query or an identified repair that is to be performed. For example, the outlays for performing the same repair at different times on the same or similar equipment may fluctuate with respect to time. The controller can examine historical repair data to calculate an average outlay for performing the repair across multiple performances of the repair on the same or similar equipment. In another embodiment, a real-time quote aggregator can be utilized. In another embodiment, a combination of the above techniques (e.g., average outlay, outlay per duration of time, real-time quote, among others) can be utilized to create a projected outlay. In an embodiment, the controller can calculate a transportation outlay for delivery of the equipment to a repair facility. The controller can include the transportation outlay with the projected outlay (e.g., each repair facility quote for a repair is matched or associated with the respective transportation outlay).

The controller 120, memory 130, sensors 140, and/or input devices 110 may communicate with each other via the communication system 150. The communication system 150 can represent one or more communication networks, such as at least part of the Internet, a local area network, a wide area network, or the like. This allows for the controller 120, memory 130, sensors 140, and/or input devices 110 to be located far apart from each other. Optionally, two or more of the controller 120, memory 130, sensors 140, and/or input devices 110 may be part of the same computing system or computer.

Figure 2:
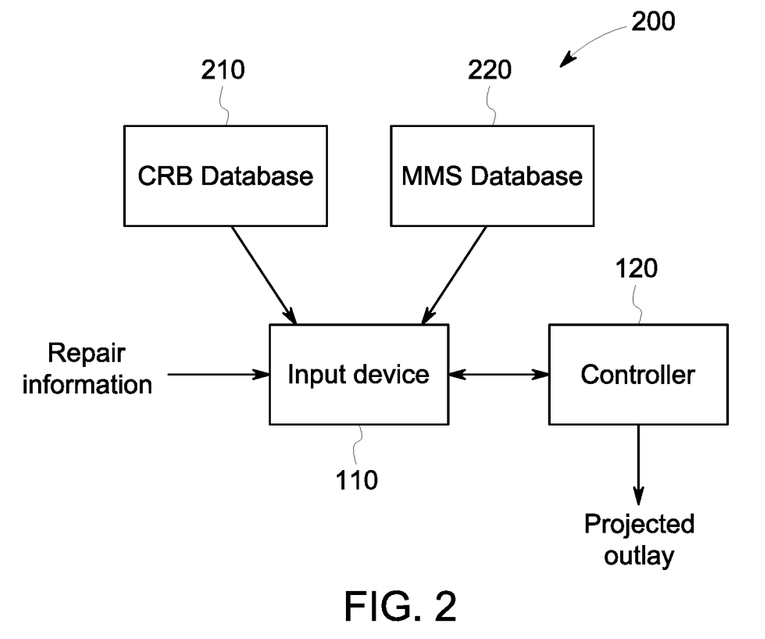
FIG. 2 illustrates an embodiment of an equipment repair system for utilizing a portion of repair data or a portion of outlay data to forecast a projected outlay for at least one repair.

FIG. 2 illustrates an equipment repair system 200 that examines a portion of repair data or a portion of outlay data to forecast a projected outlay for at least one repair. The system can provide a projected outlay for a repair to perform on one or more pieces of equipment based on a portion of repair information collected or received by the input device. The projected outlay can be for a query based on a hypothetical scenario, financial situation, budget question or concern, or a related outlay of repair concern. For instance, the controller can determine a repair to be performed (e.g., based on a schedule of repairs and/or operator input), and the controller can calculate a projected outlay based on the predicted repair utilizing the repair information. Additionally, the projected outlay can be for an identified repair that is to be performed. For instance, the projected outlay for a list of repairs that are to be performed on equipment can be indicated based on the repair information.

By way of example and not limitation, repair information can be a previous repair on a piece of equipment, a part used in a repair on a piece of equipment, a date or time a repair was performed on a piece of equipment, a repair facility that performed the repair on the piece of equipment, repair details (e.g., who performed repair, issues related to performing the repair, duration of time to complete repair, downtime for the piece of equipment that received the repair, among others), financial information related to the repair (e.g., cost of repair, cost of part(s) for repair, among others), a total outlay for a repair (e.g., an invoice, listing of hours of labor needed to complete the repair, listing of parts consumed or used to complete the repair, etc.), equipment information (e.g., type of equipment, use of the equipment, cargo load of the equipment, location of the equipment, conditions of use for the equipment, owner of the equipment, pricing contract for repairs to the equipment, among others), data related to the MMS, data related to the CRB system, and the like.

The system can be utilized with the CRB system (e.g., with a CRB database 210 used to store data of the CRB system, the MMS, and/or an MMS database 220 used to store data of the MMS, as well as an environment (e.g., user, repair shop, company, entity, corporation, among others) that employs the CRB system and/or the MMS. For instance, information stored in the CRB database and/or the MMS database can be accessed by the controller (e.g., via the input device) in order to ascertain at least one of a history of repair(s), repairs performed, duration of repairs, frequency of repairs, part(s) used for a repair on equipment, cost of a repair, among others.

Figure 3:
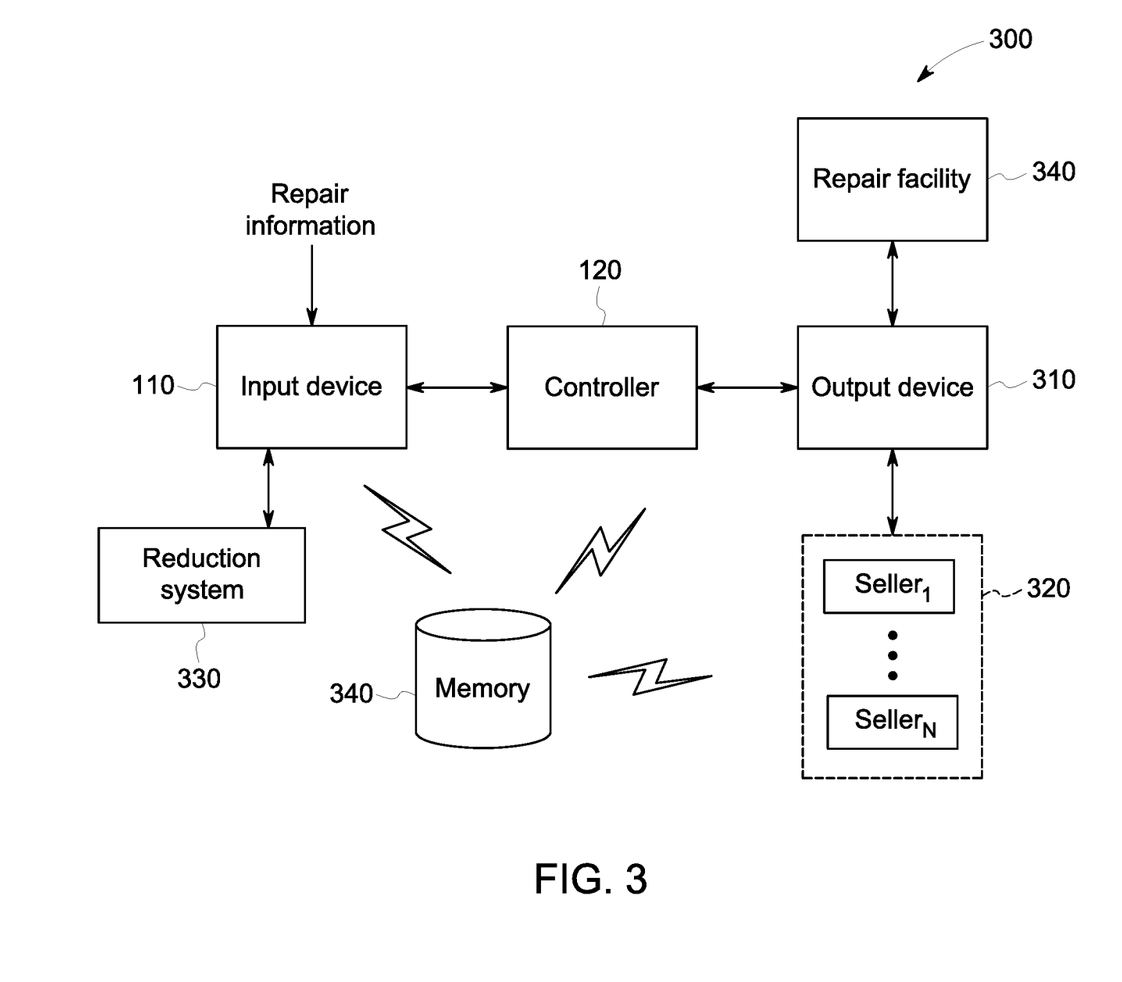
FIG. 3 illustrates an embodiment of an equipment repair system for managing an inventory of one or more parts utilized in one or more repairs on equipment.

FIG. 3 illustrates an equipment repair system 300 that manages inventory of one or more parts utilized in one or more repairs on equipment. The controller can evaluate a portion of historic data related to a previous outlay for a repair on one or more pieces of equipment. Based at least in part upon this evaluation, the controller can generate a projected outlay related to a repair that is to be performed on one or more pieces of equipment. By basing the projected outlay on historical data, the controller can determine an accurate projection or forecast for repair outlays that can be used for generating or updating budgets and/or to manage the repairs.

The controller optionally can manage (e.g., track) an inventory of one or more parts used for at least one repair on the one or more pieces of equipment. The controller can utilize the repair information (e.g., identifying a repair and a part(s) used for completed repairs and/or orders for new/incoming part(s), among others) to maintain an accurate quantity of part(s) within an inventory at one or more locations. For instance, the controller can automatically generate orders for one or more part(s), can generate user-controlled generation of purchase orders based on input received via the input device, can automatically notify of inventory quantity for each part(s), or a combination thereof. The controller can communicate a purchase order to one or more sellers 320 via an output device 310. The output device can represent transceiving equipment, such as one or more antennas, modems, or the like, that communicate via one or more wireless and/or wired connections with the sellers or other entities, where there can be a number of sellers such as seller 1 to seller N, where N is a positive integer. For instance, a seller can be a manufacturer, a repair facility, a vendor, a merchant, a manufacturer, among others. In another embodiment, the controller can order a part(s) from the one or more sellers via communication from the output device.

In one embodiment, the controller communicates control signals to one or more repair facilities 340 via the output device. The repair facilities represent one or more locations and systems that perform repairs on equipment. For example, a repair facility can include an auto body shop that performs repair on bodies of automobiles, a rail yard that repairs rail vehicles, a marina or port that repairs marine vessels, etc. The repair facility can represent mechanical systems that perform the repairs, such as computers (that examine signals from the equipment to determine the state or status of the equipment, the progress of repairs, etc.), cranes that lift equipment and/or parts for repairs, vehicles that carry personnel and/or parts for performing the repair to the location of the equipment, switches that change which track that systems performing the repair travel along, etc. Based on the control signals received from the controller, the mechanical systems of the repair facility may perform part or all of a repair. For example, the controller may generate a projected outlay for a repair and communicate this outlay to an operator. The operator may select the repair and, responsive to this selection received via the input device, the controller may communicate a control signal to a repair facility to begin or perform the repair (e.g., automatically). Optionally, the controller may determine multiple projected outlays for repairs and select one or more of the repairs (e.g., the repair or repairs with the lower or lowest outlays). Responsive to this selection, the controller may communicate a control signal to a repair facility to begin or perform the repair (e.g., automatically). Performance of the repair on the equipment changes the state of the equipment from a broken or faulty state (where the equipment is in need of repair and operation of the equipment is deteriorated or prevented due to the need for repair) to a repaired state (where the equipment is able to operate due to the repair).

The system includes a reduction system 330 that is used by the controller to identify a reduction in a projected or estimated outlay for a part and/or a repair. The reduction system represents hardware circuitry that includes and/or is connected with one or more processors (e.g., one or more microprocessors, field programmable gate arrays, and/or integrated circuits) and/or one or more memories that store and/or determine outlay reductions and communicate outlay reductions to the repair system. For instance, the reduction system can communicate information with the controller to communicate data representative of, but not limited to, a bulk reduction that occurs responsive to at least a designated number of parts being acquired for one or more repairs over a designated time period (e.g., every three months, every year, etc.), a sale (e.g., acquire one part, get another part for little or no outlay, a percentage off the outlay for a part, among others), a price discount, among others. The reduction system can be programmed with this information, such as by one or more operators of the reduction system, and can receive input from the repair system and other sources (e.g., other repair systems) to track acquisitions of parts and/or repairs requested by the repair systems to determine whether any reductions are applicable and the magnitude (e.g., size) of the applicable reductions.

The controller can evaluate a potential acquisition of a part (used for a repair or to replenish an inventory) or a potential purchase of a repair to perform using historic purchasing information or received/collected discounts to identify discounts that are available for use. For example, acquisition of at least a quantity of a part can yield a discount at a particular seller and the controller can communicate a request for the quantity or wait until the quantity is needed before communicating the request to the seller via the output device. In another example, the controller can identify a discount for a quantity of a number of repairs provided at a repair facility (e.g., order one repair and get one repair free). The controller may hold off on communicating a control signal to a repair facility to perform a repair on equipment unless and until the controller determines that a quantity-based reduction in the repair is applicable from the repair facility. For example, the controller may hold off on ordering repair of equipment until the controller determines that the repair facility has performed a sufficient number of repairs to warrant or result in a reduction in the outlay for performing an additional repair.

In one embodiment, the systems described herein store data representative of the information described herein in one or more memories 340. The connectivity of and/or between the memory and the components of the systems described herein can be one or more wired and/or wireless connections. The memory can store information such as, but not limited to, an invoice, equipment information, repair history for equipment, location for a repair facility, contact information for a seller, contact information for a repair facility, a repair cost, a type of repair, ownership of equipment, historical data related to an invoice, historical data related to a cost for a repair, information related to a repair facility, among others, and/or a suitable combination thereof.

The memory can represent, for example, either volatile memory or nonvolatile memory, or can include both volatile and nonvolatile memory. The memory includes, without being limited to, these and other suitable types of memory. In addition, it is to be appreciated that the data store can be a server, a database, a hard drive, a flash drive, an external hard drive, a portable hard drive, a cloud-based storage, and the like.

Figure 4:
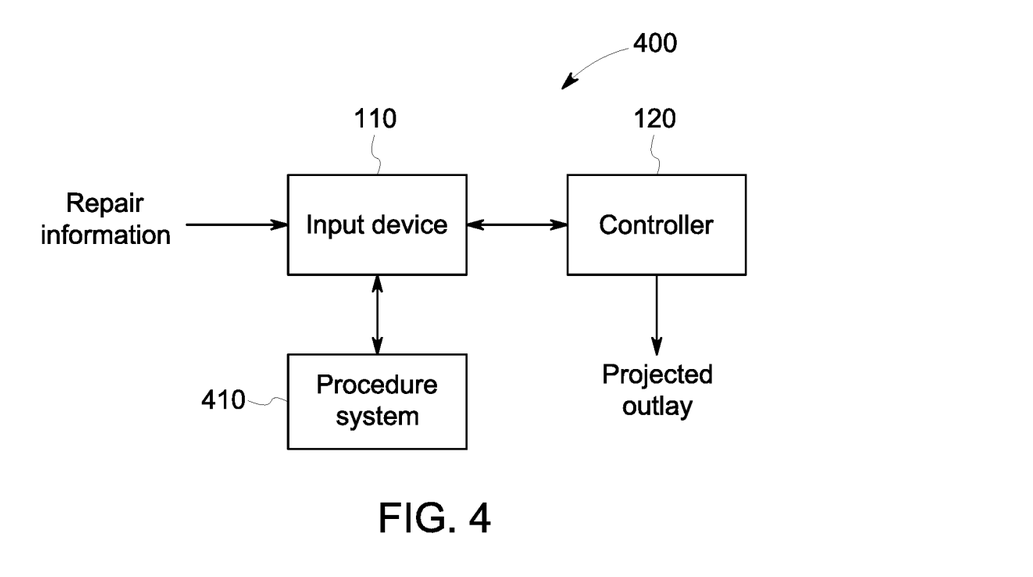
FIG. 4 is an illustration of an embodiment of an equipment repair system for evaluating whether to replace a part used in a repair procedure or repair a part used in a repair procedure.

FIG. 4 illustrates an equipment repair system 400 for evaluating whether to replace a part used in a repair procedure or repair a part used in a repair procedure. The repair system includes a procedure system 410 that determines whether to perform a repair on a part used in a repair or to replace a part used in the repair. The procedure system represents hardware circuitry that includes and/or is connected with one or more processors (e.g., one or more microprocessors, field programmable gate arrays, and/or integrated circuits) and/or one or more memories that store and/or determine which repairs are to be performed on different equipment, the dates and/or frequencies at which the repairs are to be performed, and/or the parts needed to perform the various repairs. The procedure system can be programmed with this information, such as by one or more operators of the procedure system, and can receive input from the repair system and other sources (e.g., other repair systems) to track which repairs are performed on different pieces of equipment. The procedure system can use this information to determine which repair is to be performed next on various equipment, and when the repair is to be performed.

The procedure system can identify whether to repair or replace a part based on evaluating one or more factors, where the factors can include one or more of an outlay for a part (e.g., in terms of hours of labor, financial cost, etc.), a duration of downtime for the equipment in which the part is used, an inventory quantity of the part, a difficulty assigned to the repair of the part, among others. The procedure system can prioritize (e.g., weighted, among others) each factor to identify a selection of repair or part replacement. For example, each factor may be assigned a score between a lower limit (e.g., one) and an upper limit (e.g., ten or one hundred), with the lower scores being associated with lower outlays, shorter downtimes, greater amounts of inventory, easier repairs, etc., and larger scores being associated with greater outlays, longer downtimes, smaller amounts of inventory, more difficult repairs, etc. These scores may be altered based on different weights assigned to different factors (e.g., assigned by an operator of the procedure system). For example, the downtime factor may be assigned a greater weight than the inventory quantity factor to reduce the number and/or frequency of repairs that are performed requiring significantly long downtimes even if there is very few parts needed for the repairs in inventory.

The memory (described above) can be accessed by the procedure system to store the factor(s), weight(s), and/or access historic data related to the factors and/or weights to determine whether to repair or replace a part. Although depicted as a stand-alone component, the procedure component can be incorporated into the repair system.

In one embodiment, a system is provided that includes at least one of the following: means for evaluating a portion of historic data related to a cost of a repair on one or more pieces of equipment (e.g., the system 100 and/or the controller 120); means for identifying at least one repair to perform on the one or more pieces of equipment (e.g., the system 100 and/or the controller 120); and means for forecasting a outlay cost to perform the at least one repair on the one or more pieces of equipment based at least in part upon the evaluated portion of historic data (e.g., the system 100 and/or the controller 120).

The aforementioned systems and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 5:
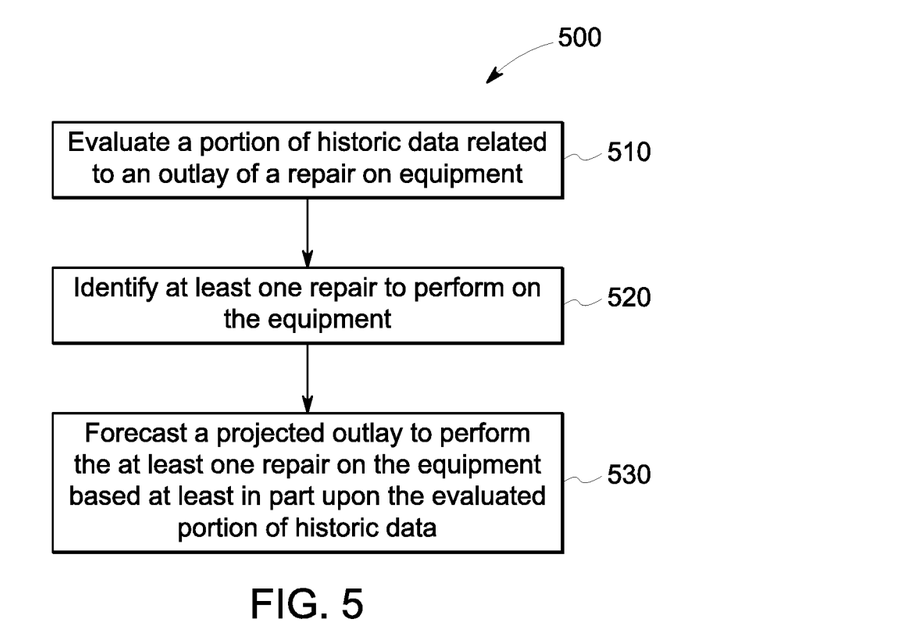
FIG. 5 illustrates a flow chart of one embodiment of a method for identifying a projected outlay to perform at least one repair on equipment.

In view of the systems described herein, methodologies that may be implemented in accordance with the disclosed subject matter will be better appreciated with reference to the flow chart of FIG. 5. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component or a portion of a component that includes at least a processor, a memory, and an instruction stored on the memory for the processor to execute.

FIG. 5 illustrates a flowchart of one embodiment of a method 500 for identifying a projected outlay to perform at least one repair on one or more pieces of equipment. At 510, a portion of historic data related to an outlay of a repair on one or more pieces of equipment can be evaluated. At 520, at least one repair to perform on the one or more pieces of equipment can be identified. At 530, a projected cost to perform the at least one repair on the one or more pieces of equipment can be forecasted based at least in part upon the evaluated portion of historic data.

The method can further include aggregating a real-time quote from at least one repair facility to perform the at least one repair on the one or more pieces of equipment. The method can further include the quote to include a cost for at least one part related to the at least one repair and an outlay for labor related to the at least one repair. The method can further include evaluating the portion of historic data related to the outlay for the repair to ascertain an outlay fluctuation over a time period and utilizing the outlay fluctuation over the time period to create the projected outlay. The method can further include receiving the portion of historic data from an MMS database and/or CRB system database.

The method can further include the portion of historic data that is an invoice for the repair on one or more pieces of equipment. The method can further include calculating a transportation outlay for delivery of the one or more pieces of equipment to a repair facility and including the transportation outlay with the projected outlay, the transportation outlay for the repair facility is associated with a quote from the repair facility. The method can further include evaluating an inventory of one or more parts for the one or more pieces of equipment and managing a quantity of one or more parts of the inventory based on the evaluation of the inventory and the identification of at least one repair to perform.

The method can further include communicating a purchase order for one or more parts associated with the identification of at least one repair to perform based upon the evaluation of the inventory. The method can further include communicating the purchase order to a seller based on the seller offering a quantity-based discount for the one or more parts. The method can further include ordering one or more parts associated with the identification of at least one repair to perform based on the evaluation of the inventory. The method can further include identifying a frequency of the repair for the one or more pieces of equipment based on the portion of historic data and generating the projected outlay to perform the at least one repair on the one or more pieces of equipment based on the frequency for a duration of time. The method can further include ascertaining whether to perform a part repair or a part replacement for the at least one repair based on the projected outlay.

In one embodiment, a vehicle repair control system includes at least one sensor configured to generate data signals relating to a first vehicle, a communication system operatively coupled to the at least one sensor, and one or more processors configured to determine a repair to be performed on the first vehicle based at least in part on the data signals received by the one or more processors from the at least one sensor over the communication system. The one or more processors also are configured to examine historic repair data indicative of outlays for previous repairs of other vehicles, and are configured to examine the historic repair data to determine fluctuations in the outlays for the previous repairs of the other vehicles and to determine a projected outlay for the repair to be performed on the first vehicle based on the fluctuations in the outlays. The one or more processors are configured to determine a quantity-based reduction in the projected outlay based on a number of repairs performed at a repair facility and to communicate a control signal to the repair facility to autonomously direct the repair to be performed on the first vehicle responsive to determining the quantity-based reduction to change a state of the first vehicle from a faulty state to a repaired state.

In one example, the one or more processors can be configured to determine a transportation outlay for moving the first vehicle from a current location to the repair facility, wherein the one or more processors are configured to determine the projected outlay based on the transportation outlay. The one or more processors may determine a frequency at which the first repair is performed on the other vehicles based on the historic repair data, where the one or more processors are configured to determine the projected outlay based on the frequency that is determined.

In one embodiment, a system includes at least one sensor configured to generate data signals relating to a first vehicle, a communication system operatively coupled to the at least one sensor, and one or more processors configured to determine a repair to be performed on the first vehicle based at least in part on the data signals received from the at least one sensor via the communication system. The one or more processors also are configured to examine historic repair data indicative of outlays for previous repairs of other vehicles, and to examine the historic repair data to determine fluctuations in the outlays for the previous repairs of the other vehicles. The one or more processors are configured to determine a projected outlay for the repair to be performed on the first vehicle based on the fluctuations in the outlays, and to perform the repair on the first vehicle based on the projected outlay by communicating a control signal to a repair facility where the repair is performed on the first vehicle to change a state of the first vehicle from a faulty state to a repaired state.

Optionally, the one or more processors are configured to determine the projected outlay as an amount of labor needed to perform the repair on the first vehicle based on labor expended during the previous repairs of the other vehicle. The one or more processors may determine a transportation outlay for moving the first vehicle from a current location to the repair facility from the repair facility, where the one or more processors are configured to determine the projected outlay based on the transportation outlay. The one or more processors can be configured to determine an inventory of one or more parts to be used in the repair to be performed on the first vehicle, where the one or more processors are configured to determine the projected outlay based on the inventory that is determined.

In one example, the one or more processors are configured to communicate a signal to the repair facility to obtain one or more additional parts based on the inventory that is determined. The one or more processors can be configured to determine a quantity-based reduction in the projected outlay based on a number of repairs performed at the repair facility and to communicate the control signal to the repair facility responsive to determining the quantity-based reduction. The one or more processors may be configured to determine a frequency at which the first repair is performed on the other vehicles based on the historic repair data, where the one or more processors are configured to determine the projected outlay based on the frequency that is determined. Optionally, the one or more processors are configured to determine the projected outlay as a projected outlay per unit time based on the historic repair data.

In one embodiment, a system includes at least one sensor configured to generate data signals relating to a first equipment, a communication system operatively coupled to the at least one sensor, and one or more processors configured to determine a repair to be performed on the first equipment based at least in part on the data signals received from the at least one sensor via the communication system. The one or more processors also are configured to examine historic repair data indicative of outlays for previous repairs of other equipment, and to determine a projected outlay for the repair to be performed on the first equipment based on the historic repair data. The one or more processors also are configured to perform the repair on the first equipment based on the projected outlay by communicating a control signal to a repair facility where the repair is performed on the first equipment to change a state of the first equipment from a faulty state to a repaired state.

The one or more processors can be configured to determine the projected outlay as an amount of labor needed to perform the repair on the first equipment based on labor expended during the previous repairs of the other equipment. The one or more processors may be configured to examine the historic repair data to determine fluctuations in the outlays for the previous repairs of the other equipment, where the one or more processors also are configured to determine the projected outlay based on the fluctuations that are determined and one or more of a date or a time that the repair is to be performed on the first equipment.

Optionally, the one or more processors are configured to determine a transportation outlay for moving the first equipment from a current location to the repair facility from the repair facility, where the one or more processors are configured to determine the projected outlay based on the transportation outlay. The one or more processors can be configured to determine an inventory of one or more parts to be used in the repair to be performed on the first equipment, where the one or more processors are configured to determine the projected outlay based on the inventory that is determined. The one or more processors may be configured to communicate a signal to the repair facility to obtain one or more additional parts based on the inventory that is determined.

In one example, the one or more processors can be configured to determine a quantity-based reduction in the projected outlay based on a number of repairs performed at the repair facility and to communicate the control signal to the repair facility responsive to determining the quantity-based reduction. The one or more processors may be configured to determine a frequency at which the first repair is performed on the other equipment based on the historic repair data, where the one or more processors are configured to determine the projected outlay based on the frequency that is determined. The one or more processors can be configured to determine the projected outlay as a projected outlay per unit time based on the historic repair data.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the inventive subject matter and to enable one of ordinary skill in the art to practice the inventive subject matter, including making and using a devices or systems and performing incorporated methods. The patentable scope of the inventive subject matter is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A vehicle repair control system comprising:
   at least one sensor configured to generate data signals relating to a first vehicle;
   a communication system operatively coupled to the at least one sensor;
   a non-transitory computer-readable medium having executable instructions stored thereon;
   one or more processors configured to access the executable instructions, the executable instructions causing at least one of the one or more processors to:
   determine a repair to be performed on the first vehicle based at least in part on the data signals received by the one or more processors from the at least one sensor over the communication system;
   examine historic repair data indicative of outlays for previous repairs of other vehicles, and determine a pattern in fluctuations in the outlays;
   determine a projected outlay for the repair to be performed on the first vehicle based on the determined pattern in fluctuations in the outlays, the projected outlay comprising a projected cost for manual labor to perform the repair;
   determine a quantity-based reduction in the projected outlay based at least in part on the projected cost for the manual labor to perform the repair and on a number of repairs to be performed at a repair facility which would result in the quantity-based reduction in the projected outlay;
   determine weightings, based on prioritization, for each of two or more factors to select one of repair or replace at least one part of the first vehicle, the two or more factors including at least one of an outlay of labor, an outlay of cost, an estimated duration of the first vehicle's downtime, an availability of inventory of the at least one part, or a difficulty in repairing the at least one part, the weightings being based on scores determined for each of the two or more factors, wherein the estimated duration of the first vehicle's downtime factor is assigned a greater score than an availability of inventory factor;
   evaluate the two or more factors based on the weightings;
   automatically generate a purchase order for replacement of the at least one part based on the evaluation;
   communicate the purchase order to one or more sellers of the at least one part; and
   communicate a control signal to the repair facility to autonomously direct the repair comprising the replacement of the at least one part to be performed on the first vehicle responsive to determining the quantity-based reduction to change a state of the first vehicle from a faulty state to a repaired state, the control signal including a selection resulting from the evaluation.

2. The system of claim 1, the executable instructions further cause at least one of the one or more processors to:
   determine a transportation outlay for moving the first vehicle from a current location to the repair facility; and
   determine the projected outlay based on the transportation outlay.

3. The system of claim 1, the executable instructions further cause at least one of the one or more processors to:
   determine a frequency at which the first repair is performed on the other vehicles based on the historic repair data; and
   determine the projected outlay based on the frequency that is determined.

4. A system comprising:
   at least one sensor configured to generate data signals relating to a first vehicle;
   a communication system operatively coupled to the at least one sensor;
   a non-transitory computer-readable medium having executable instructions stored thereon;
   one or more processors configured to access the executable instructions, the executable instructions causing at least one of the one or more processors to:
   determine a repair to be performed on the first vehicle based at least in part on the data signals received from the at least one sensor via the communication system;
   examine historic repair data indicative of outlays for previous repairs of other vehicles, and determine a pattern in fluctuations in the outlays;
   determine a projected outlay for the repair to be performed on the first vehicle based on the determined pattern in fluctuations in the outlays, the projected outlay comprising a projected cost for manual labor to perform the repair;

determine a quantity-based reduction in the projected outlay based at least in part on the projected cost for the manual labor to perform the repair and on a number of repairs to be performed at a repair facility which would result in the quantity-based reduction in the projected outlay;

determine weightings, based on prioritization, for each of two or more factors to determine whether to select one of repair or replace at least one part of the first vehicle, the two or more factors including at least one of an outlay of labor, an outlay of cost based on the projected outlay for the repair, an estimated of the first vehicle's downtime, an availability of inventory of the at least one part, or a difficulty in repairing the at least one part, the weightings being based on scores determined for each of the two or more factors, wherein the estimated duration of the first vehicle's downtime factor is assigned a greater score than an availability of inventory factor;

evaluate the two or more factors based on the weightings;

automatically generate a purchase order for replacement of the at least one part of the first vehicle based on the evaluation;

communicate the purchase order to one or more sellers of the at least one part; and perform the repair comprising the replacement of the at least one part on the first vehicle based on the automatic determination of whether to repair or replace the at least one part by communicating a control signal to a repair facility where the repair is performed on the first vehicle to change a state of the first vehicle from a faulty state to a repaired state, the control signal including a selection resulting from the evaluation.

5. The system of claim 4, the executable instructions further cause at least one of the one or more processors to determine the projected outlay as an amount of labor needed to perform the repair on the first vehicle based on labor expended during the previous repairs of the other vehicle.

6. The system of claim 4, the executable instructions further cause at least one of the one or more processors to:
determine a transportation outlay for moving the first vehicle from a current location to the repair facility; an determine the projected outlay based on the transportation outlay.

7. The system of claim 4, the executable instructions further cause at least one of the one or more processors to:
determine a quantity-based reduction in the projected outlay based on a number of repairs performed at the repair facility; and
communicate the control signal to the repair facility responsive to determining the quantity-based reduction.

8. The system of claim 4, the executable instructions further cause at least one of the one or more processors to:
determine a frequency at which the first repair is performed on the other vehicles based on the historic repair data; and
determine the projected outlay based on the frequency that is determined.

9. The system of claim 4, the executable instructions further cause at least one of the one or more processors to determine the projected outlay as a projected outlay per unit time based on the historic repair data.

10. The system of claim 4, the executable instructions further cause at least one of the one or more processors to:

determine an inventory of one or more parts to be used in the repair to be performed on the first vehicle; and
determine the projected outlay based on the inventory that is determined.

11. The system of claim 10, the executable instructions further cause at least one of the one or more processors to communicate a signal to the repair facility to obtain one or more additional parts based on the inventory that is determined.

12. A system comprising:
at least one sensor configured to generate data signals relating to a first equipment;
a communication system operatively coupled to the at least one sensor;
a non-transitory computer-readable medium having executable instructions stored thereon;
one or more processors configured to access the executable instructions, the executable instructions causing at least one of the one or more processors to:
determine a repair to be performed on the first equipment based at least in part on the data signals received from the at least one sensor via the communication system;
examine historic repair data indicative of outlays for previous repairs of other equipment, and determine a pattern in fluctuations in the outlays;
determine a projected outlay for the repair to be performed on the first equipment based on the determined pattern in fluctuations in the outlays, the projected outlay comprising a projected cost for manual labor to perform the repair;
determine a quantity-based reduction in the projected outlay based at least in part on the projected cost for the manual labor to perform the repair and on a number of repairs to be performed at a repair facility which would result in the quantity-based reduction in the projected outlay;
determine weightings, based on prioritization, for each of two or more factors to determine whether to select one of repair or replace at least one of one or more repair parts, the two or more factors including at least one of an outlay of labor, an outlay of cost based on the projected outlay for the repair, an estimated duration of the first vehicle's downtime, an availability of inventory of at least one of the one or more repair parts, or a difficulty in repairing the at least one of the one or more repair parts, the weightings being based on scores determined for each of the two or more factors, wherein the estimated duration of the first vehicle's downtime factor is assigned a greater score than an availability of inventory factor;
evaluate the two or more factors based on the weightings;
automatically generate a purchase order for replacement of the at least one part based on the evaluation;
communicate the purchase order to one or more sellers of the at least one part; and
examine historic price fluctuations of the at least one of the one or more parts, and delay the repair on the first equipment using the at least one of the one or more replacement parts based on the automatic determination of whether to repair or replace the at least one part and based on an inventory of the at least one of the one or more replacement parts relative to a quantity discount of the at least one of the one or more replacement parts by delaying communicating of a control signal to a repair facility where the replacement is performed on the first equipment to delay replacement of the one or more replacement parts of the first equipment.

13. The system of claim 12, the executable instructions further cause at least one of the one or more processors to determine the projected outlay as an amount of labor needed to perform the repair on the first equipment based on labor expended during the previous repairs of the other equipment.

14. The system of claim 12, the executable instructions further cause at least one of the one or more processors to determine the projected outlay based on the fluctuations that are determined and one or more of a date or a time that the repair is to be performed on the first equipment.

15. The system of claim 12, the executable instructions further cause at least one of the one or more processors to:
determine a transportation outlay for moving the first equipment from a current location to the repair facility; and
determine the projected outlay based on the transportation outlay.

16. The system of claim 12, the executable instructions further cause at least one of the one or more processors to communicate an order signal to the repair facility to obtain one or more additional parts based on the inventory that is determined.

17. The system of claim 12, the executable instructions further cause at least one of the one or more processors to: determine a quantity-based reduction in the projected outlay based on a number of repairs performed at the repair facility; and
communicate the control signal to the repair facility responsive to determining the quantity-based reduction.

18. The system of claim 12, the executable instructions further cause at least one of the one or more processors to:
determine a frequency at which the first repair is performed on the other equipment based on the historic repair data; and
determine the projected outlay based on the frequency that is determined.

19. The system of claim 12, the executable instructions further cause at least one of the one or more processors to determine the projected outlay as a projected outlay per unit time based on the historic repair data.

20. The system of claim 12, wherein the control signal is a first control signal, and the executable instructions further cause at least one of the one or more processors to communicate a second control signal to the repair facility to direct the repair to be performed on the first equipment to change a state of the first equipment from a faulty state to a repaired state responsive to a number of purchased items of the at least one of the one or more repair parts reaching the quantity discount, the control signal including a selection resulting from the evaluation.

* * * * *